July 31, 1951 T. E. NEBLETT 2,562,732

TELEPHONE SUBSTATION APPARATUS

Filed Aug. 13, 1949

INVENTOR.
THEODORE E. NEBLETT
BY
Zoltan Polachek
ATTORNEY

Patented July 31, 1951 2,562,732

UNITED STATES PATENT OFFICE 2,562,732

TELEPHONE SUBSTATION APPARATUS

Theodore E. Neblett, Rockville Centre, N. Y.

Application August 13, 1949, Serial No. 110,171

4 Claims. (Cl. 179—100)

This invention relates to telephone instruments, and the subject thereof is a new telephone substation set of the kind in the art known as a desk set, for practicably affording a means of readily and in a novel manner rearranging the two principal structures thereof, to wit, the main basal structure, and the liftably separable structure, characteristically today included in such a set and in the art called the hand telephone, thereby to effect the attainment of a sometimes very important space-saving object.

Another and incidental object of the invention is to provide a novel and valuable telephone desk set which is characterized by highly efficient performance, negligible cost of manufacture, substantially universal applicability, and inconspicuousness when in use, and which, moreover, is adapted to be included in the telephone set incidental to its fabrication, so as not to involve violation of the rule ordinarily issued by a telephone company that a subscriber must not add to the telephone set any auxiliary appliance.

An important object of this invention is to provide a telephone of this kind which will prevent the overlapping of the base by the telephone receiver and transmitter and thus to prevent inadvertent tilting or removing of the telephone receiver and transmitter from the hook by external objects placed alongside the telephone, thereby to open the telephone circuit.

According to the present invention, with the basal structure, hereinbelow called the base, of elongate extension, as is usual, and with the hand telephone of elongate extension, also as usual, and further with the cradle of elongate extension as, too, is customary (said cradle for having rested therein the central handle portion of the hand telephone which at opposite ends of said handle incorporates the receiver and the transmitter), said base swivelly carries the cradle; that is, the cradle is carried by the main part of the base for rotation about a substantially vertical axis, whereby, in either case with the hand telephone resting by its own weight in the cradle, the hand telephone can be arranged either to have its direction of elongation in agreement with or perpendicular to the direction of elongation of the base; thereby permitting the instrument to be arranged when not in use so that there is prevented any possible chance of another unnoticed object near the base from acting on a projected terminal portion of the hand telephone in a way to disturb the latter in its lie in the cradle and thus cause the telephone circuit to be opened to result in the giving of a busy signal to a would-be incoming telephone caller.

A feature of the invention, nevertheless, is that the switches in the base may be kept entirely as usual, always for operation in the standard way, regardless of any angular movement of the cradle relative to the base.

For further comprehension of the invention, and of the objects and advantages thereof, reference will be had to the following description and accompanying drawings, and to the appended claims in which the various novel features of the invention are more particularly set forth.

The base 10, by way of said pedestal, carries the cradle 12, for the hand telephone, 14; this cradle also, it will be observed, being of conventional appearance. Said hand telephone, too, is of standard shape and size; the same incorporating at 15 its handle portion, with at opposite ends of the latter the receiver 16 and the transmitter 17. The cradle 12 includes the usual four posts 18, spaced apart, in one direction, by about the thickness of the central subdivision of said handle portion (Figs. 1 and 3), and in a direction perpendicular to that just-named, by the customary greater distance (Figs. 2 and 4).

Said cradle 12, however, while carried, indirectly, by the base 10, is directly carried by, and as shown may be made integral with, a stepped dependent cylindrical collar 19; these parts being readily moldable from a suitable plastic, as is the base 10. The bottom of said collar rests on the substantially horizontal and plane apex portion 20 of the pedestal; and the bottom stepped formation of the collar rotatively engages an upstanding annular flange 21 surrounding a vertical opening 22 through the top of the pedestal. Said opening 22 at its bottom is enlarged by an annular recess for having fitted therein a circular plate 23. Said plate is shown as secured in place by three screws 24, under the head of each of which is a washer 25 of felt or the like to allow easy deliberate turning of the cradle relative to the base but to combat inadvertent angular shift of the cradle relative to the base.

As shown particularly in Fig. 4, the standard switch contacts, these respectively marked 26, 27, 28 and 29, may be retained, for action in the usual way, under the monitorship of a plunger 30. This plunger 30, at its bottom carrying the customary insulation piece 31, is of square cross-section along the lower portion 32 of its length, for reciprocation while being held against turning; said plunger portion 32 passing through a square opening at the center of the plate 23, and the upper main cylindrical portion of the plunger being slidable relative to a circular aperture through the floor or bed of the cradle 12. Fixed on the upper end of the plunger 30 is the familiar elliptical cap-plate 33.

As is well-known in the art of telephone instruments, said cap-plate or equivalent is normally somewhat elevated relative to the floor of the cradle 12, when the hand telephone 14 is removed from the cradle; such elevation effected by the resilient bias of the leaf-spring elements respectively carrying or constituting the contacts 26—29. Thus, with the hand telephone lifted from the cradle, the cap-plate 33 rises to the disposition indicated in dot and dash at $33^a$ in Figs. 2 and 4 and as shown in full lines in Fig. 3. Then, the contacts 26 and 27 would touch, and also the contacts 28 and 29; one of these touching pairs to open the telephone circuit and the other to disable the call-signal bell.

Also as customary, a closing plate 34 (Fig. 4) for the otherwise open bottom of the base 10, is shown as present; as also are the four corner felt feet 35 commonly mounted at the underside of the base.

The dialing device, this designated 36, and shown as of a standard type, may be conveniently placed at the front of the pedestal 11, as illustrated.

In the accompanying drawings forming a material part of this disclosure:

Fig. 1 is a top plan view of a now favored embodiment of the new telephone desk set, with the hand telephone at rest in the cradle and hence with the telephone circuit closed.

Fig. 2 front elevationally shows the instrument of Fig. 1, with one element illustrated in broken lines, in the elevated position it assumes while the telephone is in use.

Fig. 3 is a side elevation, with the last-named element shown in full lines in its said elevated position; the hand telephone having its disposition as in Figs. 1 and 2 merely indicated by outlining in broken lines its handle portion at the plane of maximum cross-section thereof, and dot and dash delineations being included to show the cradle as turned through 90° from its position in Figs. 1 and 2 and to show the hand telephone in the cradle as thus turned.

Figures 1, 2, 3, 4, 5:
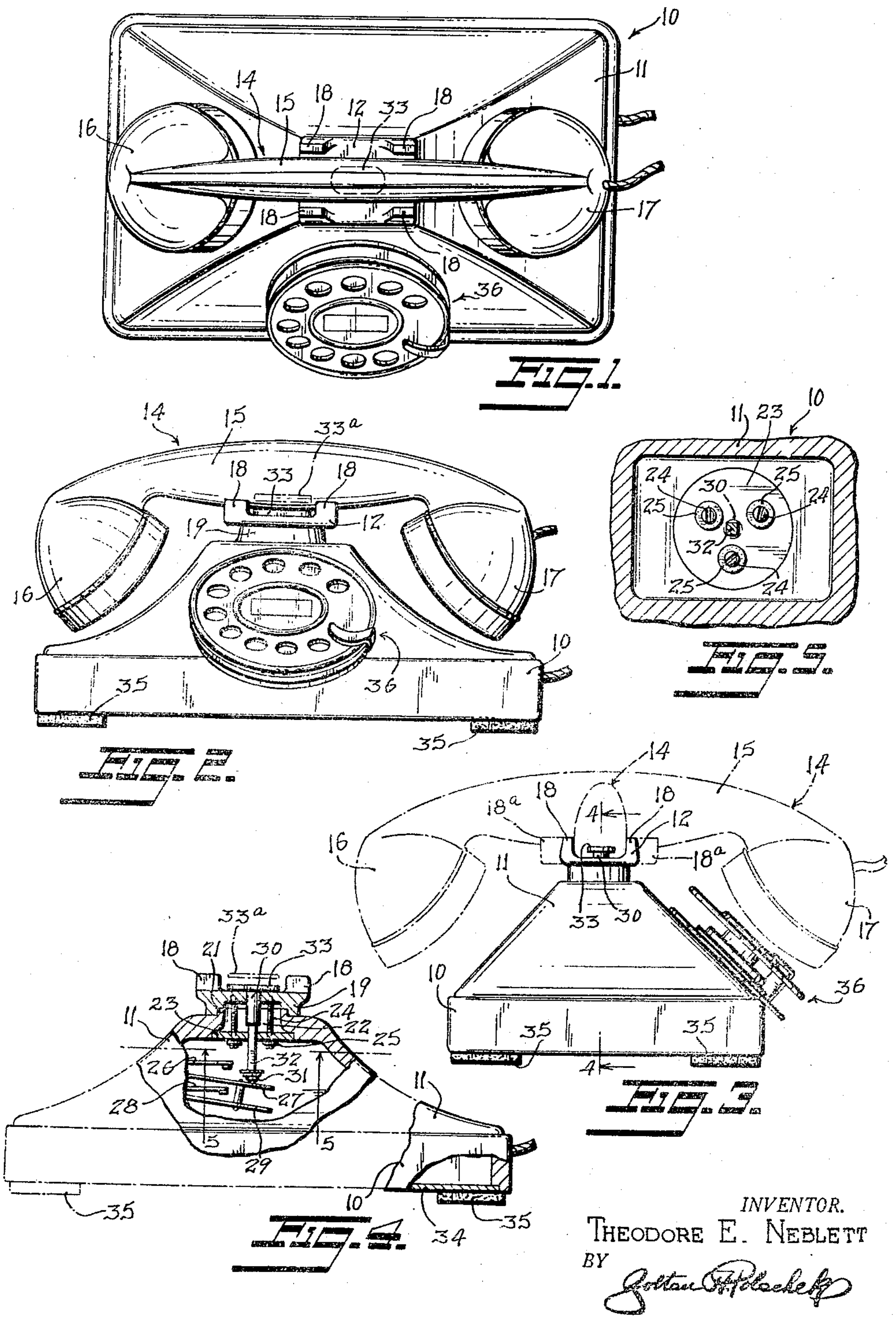
Fig. 4 is a detail view, for illustrating the interior construction, particularly relative to said switches; this view being a section taken on the line 4—4 of Fig. 3.
Fig. 5 is a fragmentary horizontal detail section, taken on the line 5—5 of Fig. 4.

The various views are drawn to about two-thirds actual scale.

Referring now to the drawings more in detail, the base, this designated 10, is so made, it will be noted, as to bear a close resemblance, as to general outline in plan, as to a substantially centrally located upwardly tapering pedestal portion 11, and as to relative dimensions all over, to the most modern design of desk set instruments.

Ordinarily, while the instrument is not in use, and with the hand telephone 14 in the cradle 12, the cradle will be arranged as in Figs. 1 and 2; and it will be noted that now, with the dialing device fully accessible as for making an outgoing call, neither the receiver 16 nor the transmitter 17 projects at all beyond the limits of the base 10. This condition, importantly, obtains all the while the telephone is not in use. For lifting the hand telephone from the cradle, however, utmost convenience in this regard is had following swing of the cradle about its pivotal axis, as to arrange the cradle as indicated in dot and dash lines at $18^a$ in Fig. 3, thus to extend the hand telephone as indicated in Fig. 3 in dot and dash lines.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a telephone instrument having a base with a cradle positioned on the top wall of the base and a switch operating plunger slidably extended from the base concentrically upward through the cradle to be depressed by a handset resting in the cradle, means rotatively mounting the cradle on the top wall of the base for rotative movement about the plunger comprising an upstanding annular flange formed on the top wall of the base concentric with the plunger, the top wall within said flange being formed with an opening through which the plunger extends, a depending collar formed on the bottom of the cradle and engaged about said flange, and means securing the cradle in position on the base with said flange extended into said collar.

2. In a telephone instrument having a base with a cradle positioned on the top wall of the base and a switch operating plunger slidably extended from the base concentrically upward through the cradle to be depressed by a handset resting in the cradle, means rotatively mounting the cradle on the top wall of the base for rotative movement about the plunger comprising an upstanding annular flange formed on the top wall of the base concentric with the plunger, the top wall within said flange being formed with an opening through which the plunger extends, a depending collar formed on the bottom of the cradle and engaged about said flange, and means securing the cradle in position on the base with said flange extended into said collar, said securing means comprising a circular plate rotatively set into the bottom face of the top wall of the base concentric with said opening, and screws extended upward through said plate and through said opening and threaded into the bottom of the cradle.

3. In a telephone instrument having a base with a cradle positioned on the top wall of the base and a switch operating plunger slidably extended from the base concentrically upward through the cradle to be depressed by a handset resting in the cradle, means rotatively mounting the cradle on the top wall of the base for rotative movement about the plunger comprising an upstanding annular flange formed on the top wall of the base concentric with the plunger, the top wall within said flange being formed with an opening through which the plunger extends, a depending collar formed on the bottom of the cradle and engaged about said flange, and means securing the cradle in position on the base with said flange extended into said collar, said securing means comprising a circular plate rotatively set into the bottom face of the top wall of the base concentric with said opening, and screws extended upward through said plate and through said opening and threaded into the bottom of the cradle, and frictional means carried by said screws for resisting free rotational movements of the cradle.

4. In a telephone instrument having a base with a cradle positioned on the top wall of the base and a switch operating plunger slidably extended from the base concentrically upward through the cradle to be depressed by a handset resting in the cradle, means rotatively mounting the cradle on the top wall of the base for rotative movement about the plunger comprising an upstanding annular flange formed on the top wall of the base concentric with the plunger, the top wall within said flange being formed with an opening through which the plunger extends, a depending collar formed on the bottom of the cradle and engaged about said flange, and means securing the cradle in position on the base with said flange extended into said collar, said securing means comprising a circular plate rotatively set into the bottom face of the top wall of the base concentric with said opening and screws extended upward through said plate and through said opening and threaded into the bottom of the cradle and resilient washers on said screws and operating between the adjacent faces of said plate and the heads of the screws for controlling frictional contact of the cradle with the top face of the top wall and said plate with the bottom face of the top wall for resisting free rotational movements of the cradle.

THEODORE E. NEBLETT.

REFERENCES CITED

The following references are of record in the file of this patent:

UNITED STATES PATENTS

| Number | Name | Date |
|---|---|---|
| 1,918,801 | Dilg | July 18, 1933 |
| 1,965,423 | Lum | July 3, 1934 |

FOREIGN PATENTS

| Number | Country | Date |
|---|---|---|
| 51,869 | Sweden | June 7, 1922 |